United States Patent [19]

Kubota et al.

[11] Patent Number: 5,072,316
[45] Date of Patent: Dec. 10, 1991

[54] RECORDING APPARATUS

[75] Inventors: Yukio Kubota; Tomihiro Nakagawa, both of Kanagawa; Norio Shindo, Tokyo; Yoichirou Senshu, Kanagawa; Akihiro Uetake, Tokyo, all of Japan

[73] Assignee: Sony Corporation, Tokyo, Japan

[21] Appl. No.: 242,325

[22] Filed: Sep. 8, 1988

[30] Foreign Application Priority Data

Sep. 11, 1987 [JP] Japan ............................ 62-229148
Oct. 20, 1987 [JP] Japan ............................ 62-264668
Jan. 13, 1988 [JP] Japan ............................ 63-005439

[51] Int. Cl.$^5$ .......................................... G11B 15/14
[52] U.S. Cl. .................................... 360/64; 360/70
[58] Field of Search ................. 360/64, 32, 22, 23, 360/70, 74.1, 19.1

[56] References Cited

U.S. PATENT DOCUMENTS

| | | | |
|---|---|---|---|
| 4,740,847 | 4/1988 | Watanabe et al. | 360/64 |
| 4,758,911 | 7/1988 | Nakano et al. | 360/64 |
| 4,768,106 | 8/1988 | Ito et al. | 360/64 |
| 4,796,105 | 1/1989 | Mawatari | 360/64 |
| 4,809,118 | 2/1989 | Nakagawa et al. | 360/19.1 |
| 4,819,089 | 4/1989 | Wilkinson et al. | 360/19.1 |

FOREIGN PATENT DOCUMENTS

0194790A1  9/1986  European Pat. Off.
3517317A1  11/1986  Fed. Rep. of Germany

Primary Examiner—Vincent P. Canney
Attorney, Agent, or Firm—Philip M. Shaw, Jr.

[57] ABSTRACT

An apparatus for recording an information signal that includes a signal processor for processing an information signal to be magnetically recorded, n magnetic heads (n is an integer of 2 or more) provided on a rotating drum with a step of about 1/n the width of a magnetic tape and a distributing circuit for selectively supplying the processed information signal to one or more than two of the n magnetic heads, wherein the processed information signal is recorded on one or more than two track areas of the magnetic tape by the magnetic head. Thus, much data can be recorded at a high transmission rate to improve the quality of picture, and also, a high access speed can be achieved.

10 Claims, 5 Drawing Sheets

RECORDING APPARATUS

BACKGROUND OF THE INVENTION

1. Field of the Invention

The present invention relates generally to recording apparatus and more particularly to a recording apparatus suitable for use in a helical-scan type video tape recorder or the like.

2. Description of the Prior Art

Various types of video tape recorders (VTRs) have been proposed so far, and most of the VTRs are of the so-called one-way recording system in which the recording is made only in one direction.

In this one-way recording system, when the recorded program is reproduced, the tape has to be rewound. Also, there is such a defect that when the tape is continuously reproduced for a long time, the reproduction of the tape is interrupted until the tape has been rewound from the beginning of the tape to the end of the tape.

To overcome such a shortcoming, a forward-and-return recording type video tape recorder was previously proposed to form a tape pattern that FIG. 1 shows. This type of video tape recorder has a unique mechanism capable of turning over a tape cassette in the up and down direction for recording or reproducing each of the forward and return sides of the tape in the same manner as an audio compact cassette recorder does. In addition, this type of video tape recorder records on video tracks at azimuth angles of ±15° the down-converted chrominance signal, the FM-modulated luminance signal and the pilot signal for tracking in a multiplexed fashion, and it is provided with such an automatic tracking mechanism by which its reproducing head is moved in the width direction of the track in accordance with the deviation amount in tracking which is detected on the basis of the pilot signal reproduced.

Although the tape travel direction apparently seems reversed in the forward and return directions, the tape actually travels in the same direction at all times because the tape cassette is turned over for each of the forward and return travels of the tape.

Furthermore, to solve the above-mentioned problem, one may consider changing to change the height of the head as in the auto-reverse type audio compact cassette recorder.

The afore-mentioned forward-and-return recording type video tape recorder, however, cannot avoid the drawback that the tape cassette has to be turned over each time for the recording of the forward and return sides of the tape, which operation is cumbersome. Further a cassette changer or other suitable means for turning over the tape cassette and setting it in proper position is needed to make the auto reverse operation possible, thus making the construction complicated.

Moreover, if it is intended to equip a helical-scan type video tape recorder with the type of mechanism that the auto-reverse type audio compact cassette recorder has in order to move the rotating head in the height direction, the width of the video track is not as wide as that of the audio track so that the construction of the mechanism will become complicated.

OBJECTS AND SUMMARY OF THE INVENTION

Accordingly, it is an object of the present invention to provide an improved recording apparatus which can obviate the defects encountered with the prior art.

It is another object of the present invention to provide a recording apparatus of a simple construction which can easily switch the forward and return modes the instant the tape travel direction is reversed.

It is a further object of the present invention to provide a recording apparatus which can produce a picture of high quality.

According to an aspect of the present invention, there an apparatus for recording both video and audio information signals on a magnetic tape comprising:

(a) processing means for separately receiving and processing the video and audio information signals to be magnetically recorded;

(b) a drum rotatable about an axis of revolution and having n (n is an integer≧2) recording/reproducing heads circumferentially spaced apart on the rotatable drum and displaced from each other at a step of about 1/n the width of the magnetic tape in the direction of the axis of revolution of the drum; and (c) distributing means for selectively supplying the processed video and audio information signals together to a selected one of n recording/reproducing heads, wherein the supplied processed video and audio information signals are recorded together in each one of a plurality of parallel tracks on the magnetic tape in one or more stage areas which are 1/n the width of the magnetic tape.

The above, and other objects, features and advantages of the present invention will become apparent from the following detailed description of the preferred embodiments, to be taken in conjunction with the accompanying drawings, throughout which like reference numerals identify like elements and parts.

DETAILED DESCRIPTION OF THE PREFERRED EMBODIMENTS

Now, an embodiment of the present invention, which is applied, for example, to a helical-scan type digital video tape recorder, will hereinafter be described in detail with reference to FIGS. 2 through 4.

Figure 1:
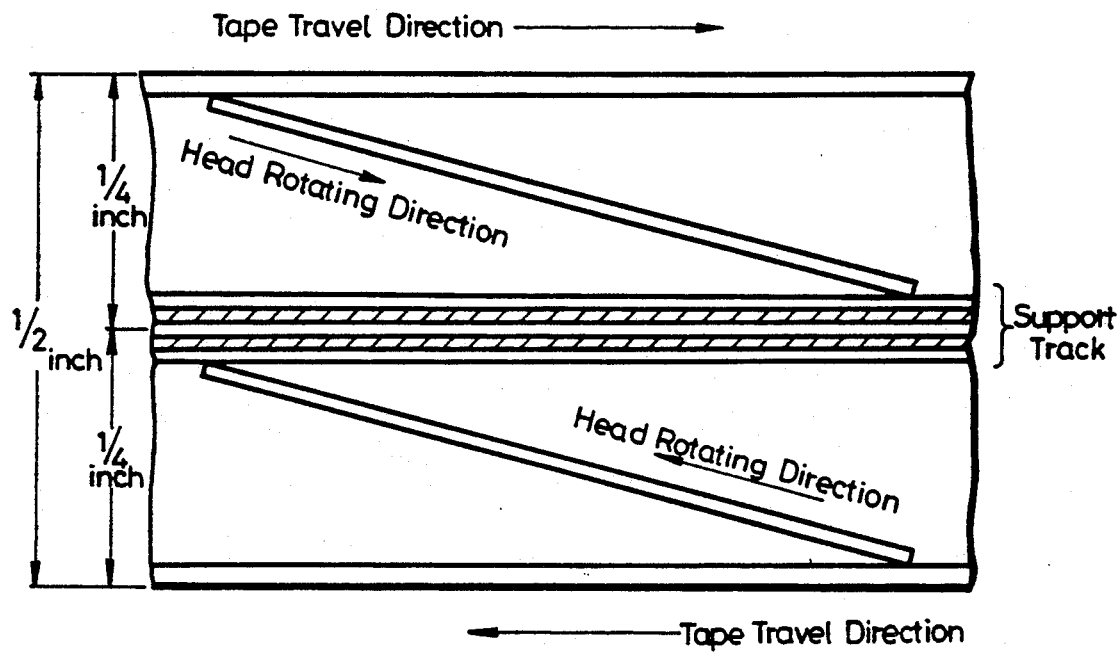
FIG. 1 is an illustration of patterns of tracks formed on a tape in the prior art.
Figure 3A:
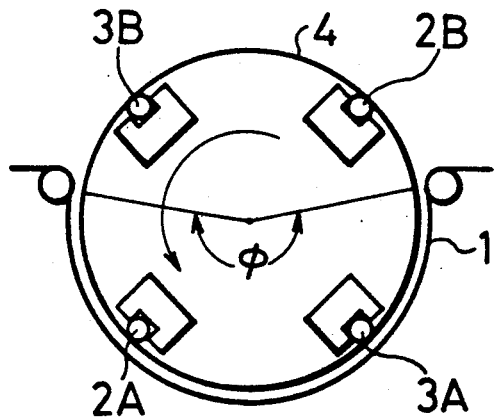
FIGS. 3A and 3B are a plan view and a front view of a head assembly of the present invention, respectively.
Figure 2:
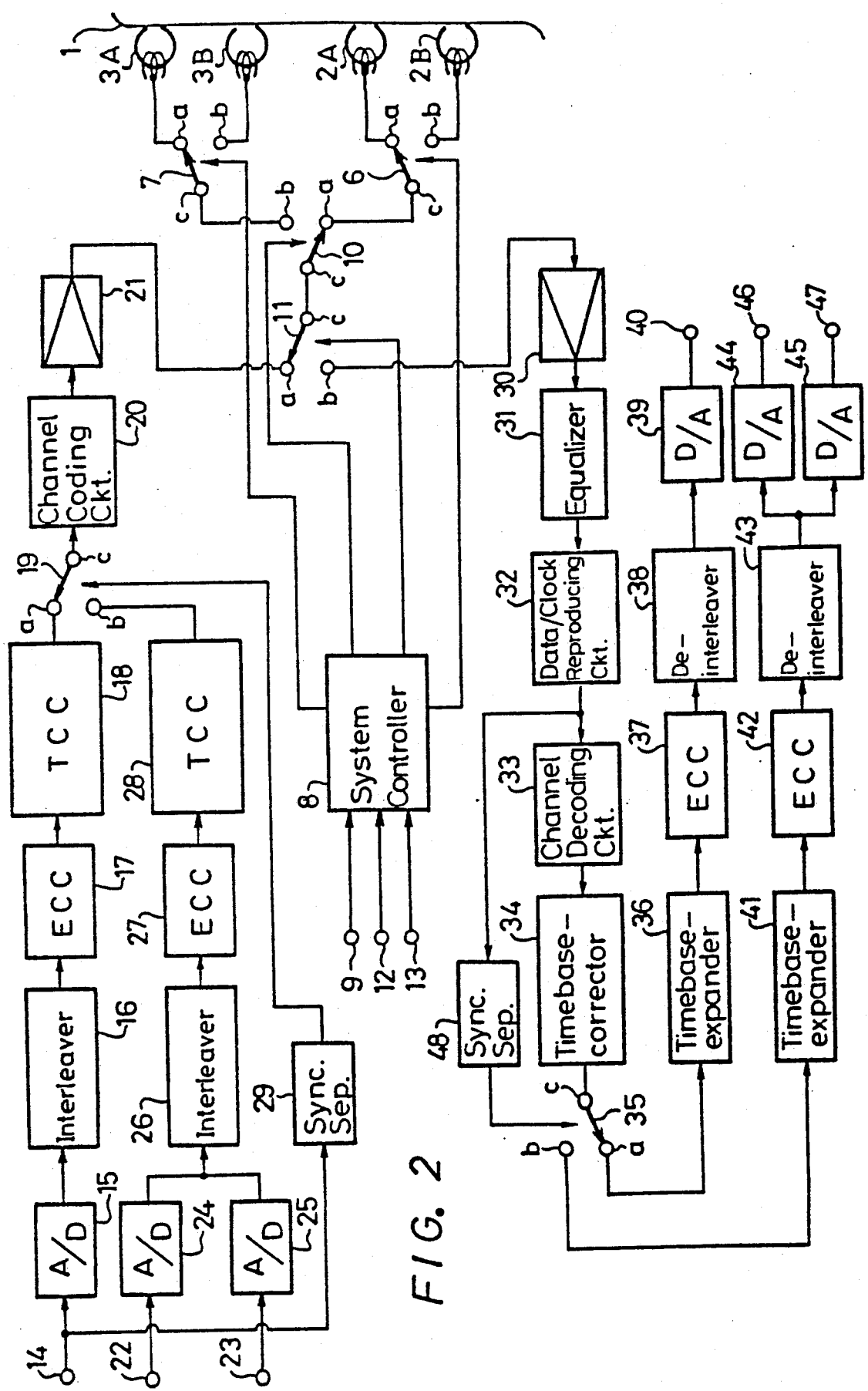
FIG. 2 is a block diagram showing an embodiment of a recording apparatus according to the present invention.

Referring to FIG. 2, a block diagram of a circuit for the recording apparatus arrangement of this embodiment is illustrated. In FIG. 2, a magnetic tape 1, a set of rotating heads 2A, 2B and another set of rotating heads 3A, 3B are shown. As better shown in FIGS. 3A and 3B, there are a pair of drums 4 and 5, located one above the other as viewed in FIG. 3B. These rotating heads 2A, 2B and 3A, 3B are disposed on the rotary drum 4 in such a relation as shown in a plan view forming FIG. 3A and a front view forming FIG. 3B. Referring to FIG. 3A, in the head assembly, each set of rotating heads 2A, 2B and 3A, 3B are opposed with an angular spacing of 180° on the periphery of the rotary drum 4, and the set of rotating heads 3A, 3B are displaced by 90° in the circumferential direction from the rotating heads 2A, 2B and by a predetermined distance, for example, about half the width of the magnetic tape 1 in the height direction therefrom as viewed in FIG. 3B.

The magnetic tape 1 is obliquely wrapped around the upper and lower drums 4 and 5 over a predetermined angular range, for example, about 180°. Thus, in this embodiment, as shown in FIG. 4, tracks skewed at a predetermined angle $\alpha$ are sequentially formed on the lower half (lower side) of the tape 1 by the rotating heads 2A, 2B, while tracks skewed at a predetermined angle $\alpha'$ are similarly sequentially formed on the upper half (upper side) of the tape 1 by the rotating heads 3A, 3B. At this time, the tape travel direction is reversed for recording each of the upper and lower sides of the tape 1 as will be described more fully below.

Turning back to FIG. 2, the rotating heads 2A and 2B are connected to fixed contacts a and b of a switch 6, respectively, and the rotating heads 3A and 3B are connected to fixed contacts a and b of a switch 7, respectively. These switches 6 and 7 are respectively changed in position by switching signals which are produced by system controller 8 on the basis of a pulse signal PG or the like fed thereto via a terminal 9 from a pulse generator (not shown).

The movable contacts c of the switches 6 and 7 are connected to fixed contacts a and b of a switch 10, and the movable contact c of the switch 10 is connected to the movable contact c of a switch 11. The switch 10 is changed in position by a switching signal from the system controller 8 that is formed on the basis of a tape end signal supplied thereto via a terminal 12 from a tape end detector (not shown). Specifically, when the lower side of the tape 1 is recorded by the rotating heads 2A and 2B, the movable contact c of the switch 10 is connected to the fixed contact a, while when the upper side of the tape 1 is recorded by the rotating heads 3A and 3B, the movable contact c of the switch 10 is connected to the fixed contact b. The switch 11 is changed in position by a record/reproduce mode switching signal that is produced from the system controller 8 in response to an operation information signal fed thereto via a terminal 13 from an operating portion (not shown). In the recording mode, the movable contact c of the switch 11 is connected to the fixed contact a and in the reproduction mode, it is connected to the fixed contact b.

A video signal is supplied to an input terminal 14. The video signal from the input terminal 14 is supplied to an A/D (analog-to-digital) converting circuit 15, in which it is converted from analog to digital signal. The thus converted digital signal is supplied to an interleaving circuit 16 where the data is re-arranged. Parity and error correction codes are added to the thus rearranged data in an error-correction encoder 17 and then timebase-compressed with a timebase-compressing ratio of, for example, 10/11 by a timebase compressing circuit 18. The timebase-compressed data is supplied through the fixed contact a and movable contact c of a switch 19 to a channel coding circuit 20 where modulation coding is performed to convert the data into a signal suitable for high-density magnetic recording, and also sync. (synchronizing) codes for frame synchronization and word synchronization are added to the data by a sync. code adding circuit (not shown). The data from the channel coding circuit 20 is supplied through a recording amplifier 21 to the fixed contact a of the switch 11.

Stereo audio signals are supplied to input terminals 22 and 23. By way of example, the left channel signal is supplied to the input terminal 22, and the right channel signal is supplied to the input terminal 23. These signals are converted from analog to digital signals by A/D converting circuits 24 and 25, respectively and re-arranged by an interleaving circuit 26. Parity and error-correction codes are added to the thus re-arranged data are added with parity and error-correction code in an error-correction encoder 27 and then timebase-compressed with a timebase-compressing ratio of, for example, 1/11 by a timebase-compressing circuit 28. The timebase-compressed data is supplied through the fixed contact b and the movable contact c of the switch 19 to the channel coding circuit 20 where they are processed in the same way as described above. The data from the channel coding circuit 20 are supplied through the recording amplifier 21 to the fixed contact a of the switch 11.

The sync. signal included in the video signal from the input terminal 14 is separated by a synchronizing circuit 29 and is used to generate a video/audio switching signal, which is fed to the switch 19. Thus, the switch 19 connects its movable contact c to the fixed contact a when the video signal from the input terminal 14 is recorded, while it connects its movable contact c to the fixed contact b when the stereo audio signals from the input terminals 22 and 23 are recorded.

A playback amplifier 30 is adapted to receive the reproduced signal from the fixed contact b of the switch 11. The signal from the playback amplifier 30 is waveform-equalized by an equalizer 31 into a waveform that is easy to identify. The output signal from the equalizer 31 is supplied to a data/clock reproducing circuit 32 where the clock is extracted from the equalized signal by a PLL (phase locked loop) or the like to produce a pulse corresponding to the bit time and the recorded digital signal (data) is reproduced by making the level comparison at this bit time. Then, the sync. code is detected to make the segmented points of the signal clear by a sync. extracting circuit not shown. Since the reproduced digital signal contains a jitter component, it is demodulated by a channel decoding circuit 33 and then timebase-corrected by a timebase-correcting circuit 34. If the timebase-corrected signal is the video signal, it is supplied through the movable contact c and fixed contact a of a switch 35 to a timebase-expanding circuit 36, where it is timebase-expanded with a timebase-expanding ratio of, for example, 11/10. Then, the timebase-expanded signal is supplied to an error-correction decoder 37, in which it undergoes some suitable signal processing such as error-correction or the like. The output from the error-correction decoder 37 is de-interleaved by a de-interleaving circuit 38 to provide the digital signal at the recording time, which is then converted from digital to analog signal by a D/A (digital-to-analog) converting circuit 39. Thus, the original video signal is developed at an output terminal 40.

If on the other hand the timebase-corrected signal is the audio signal, it is supplied through the fixed contact b of the switch 35 to a timebase-expanding circuit 41, in which it is timebase-expanded with a timebase-expanding ratio of, for example, 11/1. Then, the timebase-expanded signal is supplied to an error-correction decoder 42 where it likewise undergoes some suitable signal processing such as error-correction or the like. The output from the error-correction decoder 42 is supplied to a de-interleaving circuit 43 where recorded digital signal is de-interleaved. This digital signal, if it is the left-channel stereo audio signal, is converted by a D/A converting circuit 44 into an analog signal which appears as the original left-channel stereo audio signal at an output terminal 46. If the digital signal is the right-channel stereo audio signal, it is converted into an analog signal by a D/A converting circuit 45, thus appearing as the original right-channel stereo audio signal at an output terminal 47.

With this circuit arrangement, let it be assumed that the data is recorded on the lower side of the tape 1 when the tape 1 travels in the forward direction and recorded on the upper side of the tape 1 when the tape 1 travels in the reverse direction. When the tape 1 is being driven in the recording mode and has not yet reached its tape end, the switches 10 and 11 both connect their movable contacts c to the fixed contacts a in response to the switching signal from the system controller 8. If, now, the video signal is supplied via the input terminal 14 and the stereo audio signals are supplied via the input terminals 22 and 23, these signals are respectively processed by the A/D converting circuits 15, 24 and 25 or the like, and then appear at the fixed contacts a and b of the switch 19.

At this time, the switch 19 responds to the switching signal from the synchronizing circuit 29 to change its position in accordance with the ratio of the timebase-compressing ratios of the timebase-compressing circuits 18 and 28. In other words, the switch 19 changes position between its fixed contacts a and b in the ratio of 10 to 1.

Figure 4:
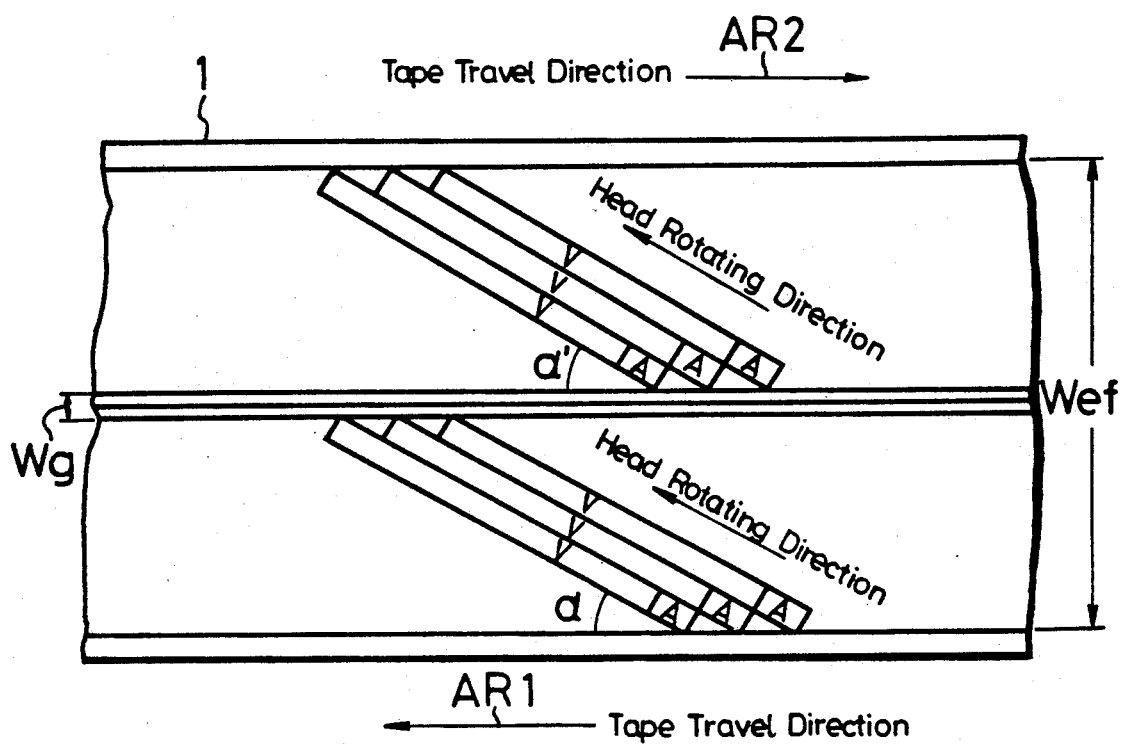
FIG. 4 is an illustration of patterns of tracks formed on a tape in the present invention.

The audio signal and the video signal from the switch 19 are supplied through the fixed contact a of the switch 11 and the fixed contact a of the switch 10 to the rotating heads 2A and 2B which are switched by the switch 6, so that these audio and video signals are recorded on the lower side of the tape 1 as shown in FIG. 4. That is, the rotating heads 2A and 2B alternately form one track on which the video signal V and the audio signal A are recorded in the predetermined ratio, for example, in the ratio of 10 to 1. Although the audio signal A is inserted into the starting portion of each track in FIG. 4, it may be recorded in a desired place of each track.

When the tape 1 has just reached its tape end while the audio signal and the video signal are being recorded on the lower side of the tape 1, the tape end signal is supplied through the terminal 12 to the system controller 8. Consequently, the switching signal from the system controller 8 controls the switch 10 to connect its movable contact c to the fixed contact b. At the same time, the system controller 8 controls a capstan (not shown) or the like to reverse the tape travel direction. To be more concrete, as shown in FIG. 4, the tape 1 that has been so far transported left (as shown by an arrow AR1 in FIG. 4) begins to travel right (as shown by an arrow AR2) the moment the tape end is detected.

Also in this case, the audio signal and the video signal from the switch 19 are supplied through the fixed contact a of the switch 11 and the fixed contact b of the switch 10 to the rotating heads 3A and 3B which are switched by the switch 7, so that they are recorded along the upper side of the tape 1 as shown in FIG. 4. In other words, the rotating heads 3A and 3B alternately form one track on which the video signal V and the audio signal A are recorded in a given ratio, for example, in the ratio of 10 to 1 as illustrated in FIG. 4.

In the reproduction mode, the switching signal from the system controller 8 controls the switch 11 to connect its movable contact c to the fixed contact b and the switch 10 to connect its movable contact c to the fixed contact a, respectively. Accordingly, the audio and video signals reproduced from the lower side of the tape 1 by the rotating heads 2A and 2B are supplied through the switch 6 and the fixed contact a of the switch 10 and the fixed contact b of the switch 11 to the playback amplifier 30 or the like where they are processed as described above, thus appearing at the movable contact c of the switch 35.

At this time, the switch 35 is changed in position in response to the switching signal from the synchronizing circuit 48 at a ratio between the timebase-expanding ratios of the timebase-expanding circuits 36 and 41. In other words, the switch 35 is changed in position between its fixed contacts a and b in the ratio of 10 to 1.

The video signal passing through the fixed contact a of the switch 35 is processed in the timebase-expanding circuit 36 and so on as described above, thus appearing as the original video signal at the output terminal 40. While, the audio signal passing through the fixed contact b of the switch 35 is processed in the timebase-expanding circuit 41 and so on as described above, thus developing as the original stereo audio signals at the output terminals 46 and 47, respectively.

Thus, when the tape 1 has just reached its tape end while the audio signal and the video signal are being reproduced from the lower stage of the tape 1, the tape end signal is supplied through the terminal 12 to the system controller 8 and as a result, the switching signal from the system controller 8 controls the switch 10 to connect its movable contact c to the fixed contact b. At the same time, the system controller 8 controls the capstan (not shown) or the like to reverse the tape travel direction. That is, as shown in FIG. 4, the tape 1 that has been so far transported in the direction shown by the arrow AR1 in FIG. 4 begins to travel in the direction shown by the arrow AR2 the moment the tape end is detected.

The audio and video signals reproduced from the upper side of the tape 1 by the rotating heads 3A and 3B are supplied through the switch 7 and the fixed contact b of the switch 10 and the fixed contact b of the switch 11 to the playback amplifier 30 or the like and thereby processed as described above, thus appearing at the movable contact c of the switch 35.

The audio and video signals developed at the movable contact c of the switch 35 are distributed by the switch 35 as described above. The video signal passing through the fixed contact a of the switch 35 is processed in the timebase-expanding circuit 36 or the like as described above, thus appearing as the original video signal at the output terminal 40. The audio signals passing through the fixed contact b of the switch 35 is processed in the timebase-expanding circuit 41 or the like as described above, thus appearing as the original stereo audio signals at the output terminals 46 and 47, respectively.

In the reproduction mode it is possible that while the lower side of the tape 1 is being reproduced by the rotating heads 2A and 2B the system controller 8 controls only the switch 10 to connect its movable contact c to the fixed contact b from the fixed contact a so that the upper side of the tape 1 is reproduced by the rotating heads 3A and 3B for the so-called reverse picture to be viewed for a short period of time, and again after the short reproduction of the upper side of the tape 1 the system controller 8 controls the switch 10 to connect its movable contact c to the fixed contact a from the fixed contact b so that the lower side of the tape 1 is again reproduced by the rotating heads 2A and 2B. In this way, the end and beginning of a movie or a video program can be seen for a short period of time. Moreover it is possible that if necessary, the tape travel direction is changed at the same time when the switch 10 connects its movable contact c to the fixed contact b from the fixed contact a under the control of the system controller 8, so that the upper side of the tape 1 is continuously reproduced by the rotating heads 3A and 3B. In addition, the reverse picture may be displayed on the entire screen or on a part of the screen in the so-called picture-in-picture fashion. In this case, the reverse picture may be displayed on the screen at all times.

According to the present invention, since the track of the tape is divided into at least two portions (e.g., an upper side and a lower side) and the tape travel direction is changed when the recording on each side or stage has been completed, the recording apparatus is simple to construct but is able to reverse the direction that the tape travels, between the forward and the return derection, at once when the tape end is reached. The tape travel direction is reversed without having to perform a cumbersome operation such as turning over the tape cassette or the like. As compared with the conventional one-way recording of the same tape length as the total length by connecting the forward and return sides of the tape in the longitudinal direction thereof, the substantial tape length can be halved with the same recording time and a high speed access can be achieved therefor.

Another embodiment of a recording apparatus according to the present invention will be described hereinafter with reference to FIGS. 5 to 7.

In this embodiment, the present invention is applied to a recording and reproducing apparatus for recording and reproducing a signal of excellent picture quality.

Figure 3B:
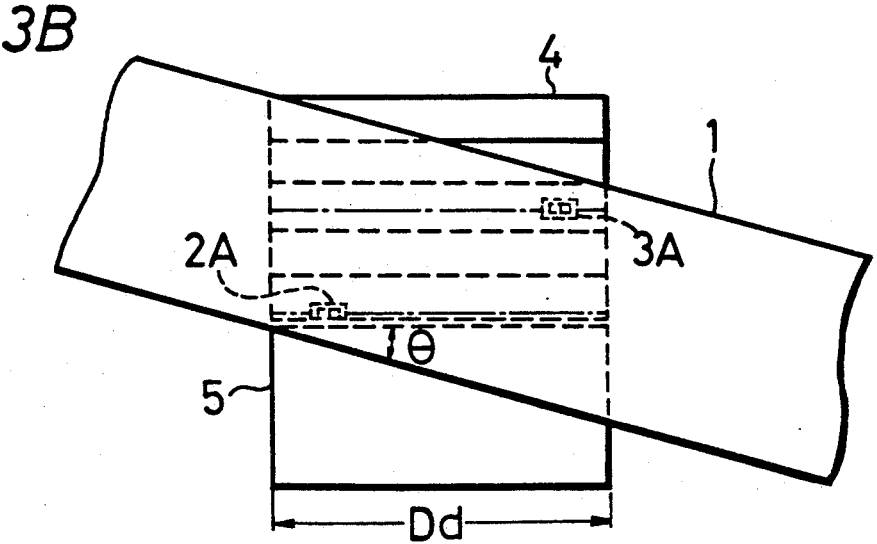
Figure 5:
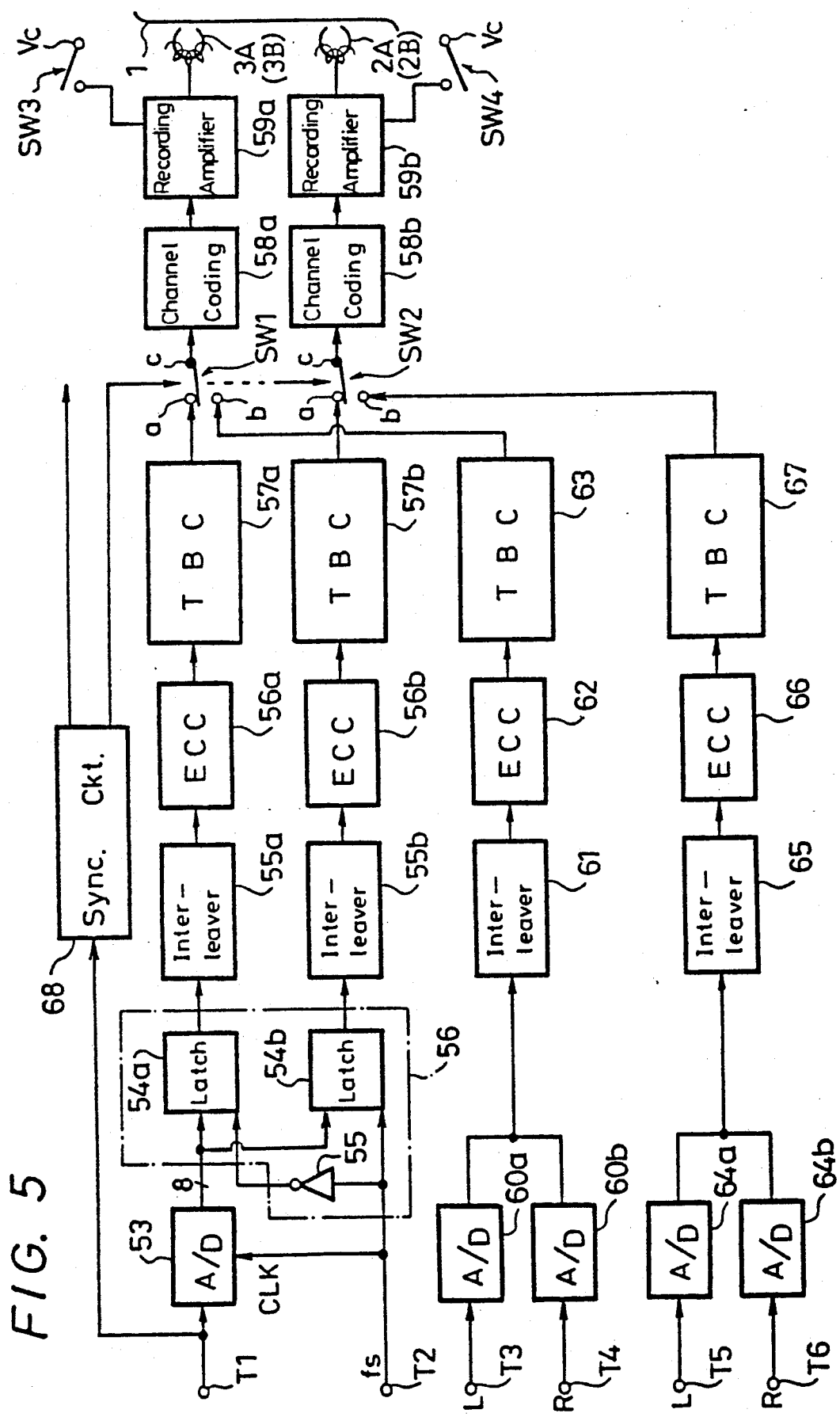
FIG. 5 is a block diagram showing another embodiment of the present invention and high-lighting a recording system thereof.
Figure 6:
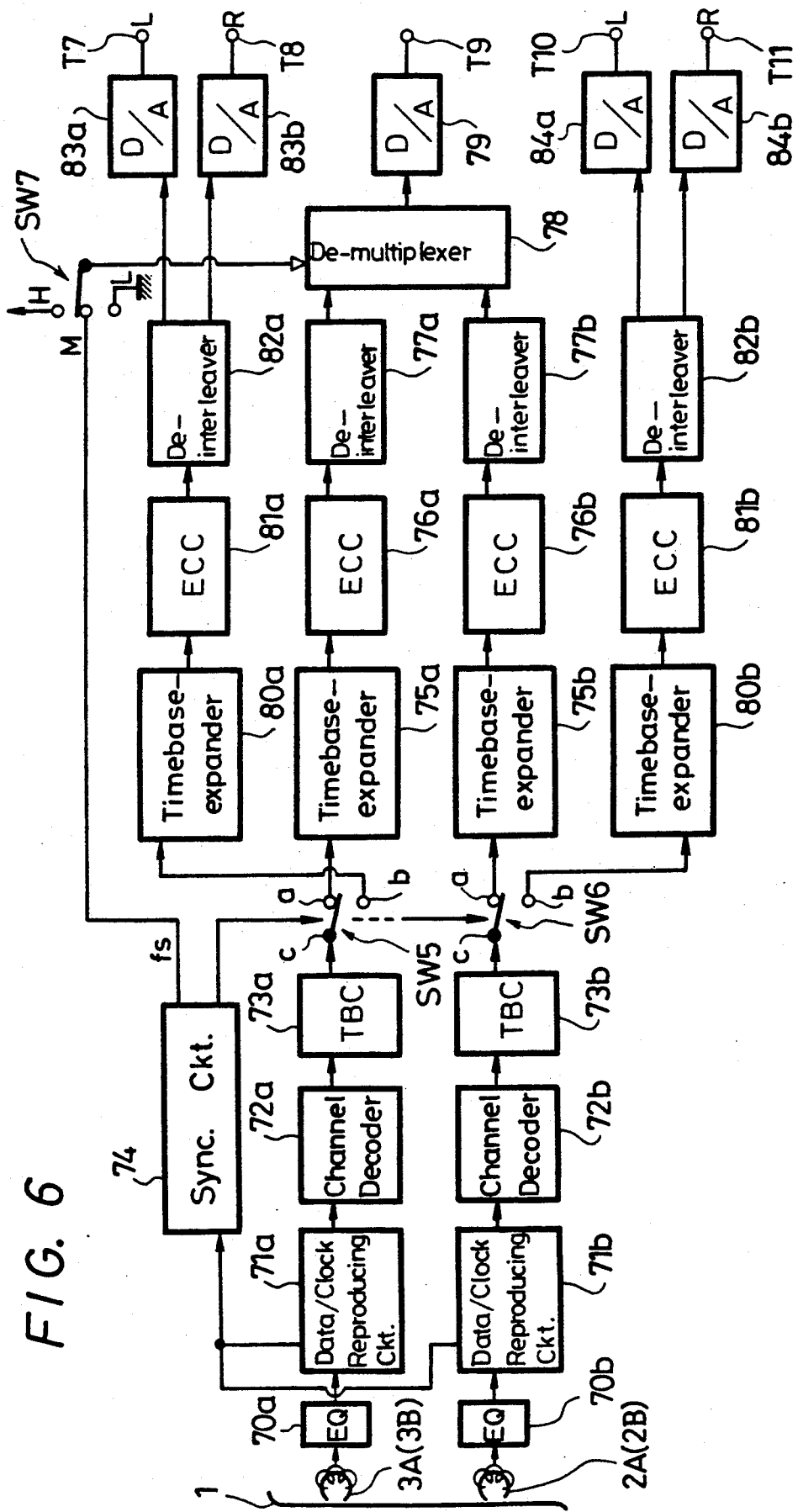
FIG. 6 is a block diagram showing another embodiment of the present invention and high-lighting a reproducing system thereof.

FIG. 5 is a block diagram of the recording-side circuit, and FIG. 6 is a block diagram of the reproducing-side circuit. Although only two rotating heads 2A and 3A are shown in FIGS. 5 and 6, two sets of rotating heads 2A, 2B and 3A, 3B are disposed on the lower stage and upper stage of the rotating drum 4 with a predetermined distance, for example, a distance about half the width of the tape 1 as shown in FIGS. 3A and 3B. As described hereinabove, one set of the rotating heads 3A, 3B are opposed to each other by the distance of 180° on the peripheral portion of the upper stage of the rotary drum 4, and the other set of the rotating heads 2A, 2B are deviated by 90° from the former rotating heads 3A, 3B in the circumferential direction and by the distance of 180° on the periphery of the lower stage of the rotating drum 4.

In the example of FIG. 5, there are provided 6 input terminals T1 to T6. A video signal is supplied to the input terminal T1, a sampling frequency fs is supplied to the input terminal T2, and left- and right-channel stereo audio signals, which are to be fed to the upper-side rotating heads 3A, 3B and the lower-side rotating heads 2A, 2B, are supplied to the 4 input terminals T3 to T6, respectively.

The video signal from the input terminal T1 is supplied to an A/D converter 53 that serves as converting means. This A/D converter 53 is also supplied with the sampling frequency fs from the input terminal T2 and thus the A/D converter 53 converts the video signal into data of 8-bit digital signal on the basis of the sampling frequency fs. The output from the A/D converter 53 is supplied to an upper-side latch circuit 54a and a lower-side latch circuit 54b, respectively. The upper-side latch circuit 54a is also supplied with the sampling frequency fs from the input terminal T2 through an inverter circuit 55, while the lower-side latch circuit 54b is also supplied with the sampling frequency fs directly from the input terminal T2. Both the latch circuits 54a, 54b latch the data from the A/D converter 53 when the sampling frequency fs is at high level H. The sampling clocks fed to the latch circuits 54a, 54b alternately become high (H) and low (L) is level. Thus, opposite levels are alternately applied to the latch circuits 54a, 54b so that the data is latched by alternate latch circuits 54a, 54b. Therefore, the block surrounded by a one-dot chain line and represented by reference numeral 56 in FIG. 5 form data dividing means.

The outputs from the latch circuits 54a, 54b are supplied to interleaving circuits 55a, 55b, respectively where the data are re-arranged. The thus re-arranged data are added with parity and error-correction code b error-correction encoders 56a, 56b and timebase-compressed by timebase-compressing circuits 57a, 57b, respectively. The timebase-compressed data is supplied through fixed contacts a, a and the movable contacts c, c of switches SW1, SW2 to channel coding circuits 58a, 58b, respectively. The channel coding circuits 58a, 58b perform the modulation coding for converting the data into signals suitable to be magnetically recorded at high density and add thereto sync. codes for frame synchronization and word synchronization by synchronizing circuits (not shown). The outputs from the channel coding circuits 58a, 58b are supplied through recording amplifiers 59a, 59b to the rotating heads 3A, 3B and 2A, 2B, respectively. The recording amplifiers 59a, 59b are turned ON and OFF by the swithes SW3 and SW4, or actuated when the switches SW3 and SW4 are turned ON while they are de-energized when the switches SW3 and SW4 are turned OFF. The switches SW3 and SW4 are controlled by the system controller (not shown in FIG. 5 but shown in FIG. 2), thereby to actuate the recording amplifiers 59a, 59b as shown in the following table 1.

TABLE 1

| upon recording | recording amplifier 59 a | recording ampifier 59 b |
|---|---|---|
| forward way in normal mode | OFF | ON |
| return way in normal mode | ON | OFF |
| in high quality mode | ON | ON |

The audio signals input to the input terminals T3, T4 for the upper-side of tape 1 are respectively converted from analog to digital signals by A/D converters 60a, 60b and re-arranged by an interleaving circuit 61. The thus re-arranged data is added with parity and error-correction code by an error-correction encoder 62, timebase-compressed by a timebase-compressing circuit 63 and then supplied to the other fixed contact b of the switch SW1.

The stereo audio signals input to the input terminals T5, T6 for the lower-side of the tape 1, similarly as those input via the upper-side input terminals T3, T4, are supplied to the other fixed contact b of the switch SW2 through A/D converters 64a, 64b, an interleaving circuit 65, an error-correction encoder 66 and a timebase-compressing circuit 67.

The video signal from the input terminal T1 is also supplied to a synchronizing circuit 68. The synchronizing circuit 68 separates a synchronizing signal from the video signal and generates a servo reference signal and a video/audio switching signal on the basis of the synchronizing signal. The servo reference signal is supplied to the system controller (not shown), and the video/audio switching signal is supplied to the switches SW1 and SW2, thus controlling the switches SW1, SW2 to change in position. Specifically, when the video signal from the input terminal T1 is recorded, the switches SW1, SW2 connect their movable contacts c, c to one fixed contact a, a. When the stereo audio signals from the input terminals T3 to T6 are recorded, the switches SW1, SW2 connect their movable contacts c, c to the other fixed contacts b, b.

Referring to FIG. 6, the output signals reproduced or picked up from the tape 1 by the upper-side heads 3A, 3B and the lower-side heads 2A, 2B are respectively supplied to equalizers 70a, 70b where they are equalized into waveforms that are easy to identify. The output signals from the equalizers 70a, 70b are respectively supplied to data/clock reproducing circuits 71a, 71b. The data/clock reproducing circuits 71a, 71b are adapted to extract clocks by a PLL or the like from the equalized signals and make up pulses corresponding to bit time, and the data or recorded digital signals are reproduced by comparing levels at the bit time. Then, the sync. codes are detected to make the points of the segmented signal clear. Since the digital signals of reproduced data contain a jitter component, they are demodulated by channel decoding circuits 72a, 72b and then timebase-corrected by timebase-correcting circuits 73a, 73b, respectively. The outputs from the timebase-correcting circuits 73a, 73b are supplied to movable contacts c, c of switches SW5, SW6, respectively. These switches SW5, SW6 each have two fixed contacts a, b. The two switches SW5, SW6 are changed in position in response to the video/audio switching signal from the synchronizing circuit 74 in such a fashion that when the signals sent from the rotating heads 3A, 3B and 2A, 2B are the video signals, the switches SW5, SW6 connect their movable contacts c, c to one fixed contacts a, a, while when they are the audio signals, the switches SW5, SW6 connect their movable contacts c, c to the other fixed contacts b, b.

One fixed contacts a, a of the switches SW5, SW6 are connected to timebase-expanding circuits 75a, 75b, respectively. Thus, the data are timebase-expanded by the timebase-expanding circuits 75a, 75b and then processed for some suitable signal processing such as error-correction or the like in error-correction decoding circuits 76a, 76b, respectively. The outputs from the error-correction decoding circuits 76a, 76b are de-interleaved by succeeding de-interleaving circuits 77a, 77b back into the digital signals at the time of recording. These digital signals are supplied to a de-multiplexer (DE MPX) 78.

On the other hand, the synchronizing circuit 74 is supplied with the output signals from the data/clock reproducing circuits 71a, 71b and separates the sync. codes from the output signals so as to form the video/audio switching signal and the sampling frequency fs on the basis of the sync. code. This sampling frequency fs is supplied to one fixed contact M of a switch SW7. This switch SW7 includes two other fixed contacts H and L. The fixed contact H is supplied with a constant voltage and the fixed contact L is grounded. The switch SW7 is changed in position by the system controller (not shown), and the output signal from the switch SW7 is used to control the de-multiplexer 78 to switch. The system controller controls the switch SW7 to change to such positions as shown in the following table 2 for normal mode, high picture quality mode or the like. Also, the de-multiplexer 78 is controlled by the output signal from the switch SW7 as shown on the table 2. The output from the de-multiplexer 78 is supplied to a D/A converter 79 where it is converted into the original analog signal, thus the video signal being produced at an output terminal T9.

TABLE 2

| upon reproduction | switch SW7 | video | audio |
|---|---|---|---|
| forward direction in the normal mode | L | DE-MPX 78 selects lower-stage data | only lower-stage output |
| backward derection in the normal mode | H | DE-MPX 78 select upper-stage data | only upper-stage output |
| high picture quality mode | M | DE-MPX 78 selects upper- and lower-stage data alternately at fs | upper- and lower-stage (4 ch stereo) |

The fixed contacts b, b of the above-mentioned two switches SW5, SW6 are connected to timebase-expanding circuits 80a, 80b, respectively where the audio data are timebase-expanded. The thus timebase-expanded data are then processed for error-correction or the like in error-correction code decoding circuits 81a, 81b and then de-interleaved by de-interleaving circuits 82a, 82b back into the digital signals at the time of recording. When these digital signals are ones recorded in the forward direction, they are converted into analog signals by D/A converters 83a, 83b, thus the original L and R channel signals being produced at output terminals T7, T8, respectively. When the digital signals are ones recorded in the backward direction, they are converted into analog signals by D/A converters 84a, 84b, thus the original L and R channel signals being produced at output terminals T10, T11, respectively.

The action of the above-mentioned arrangement will be described below.

In the normal recording mode, for the forward direction, the switching signals from the system controller (not shown) control the switches SW3, SW4 (FIG. 5) to OFF-position and to ON-position, respectively. When the video signal is supplied via the input terminal T1 and the sampling frequency fs is supplied via the input terminal T2, the video signal is converted into the digital signal (data) of 8 bits by the A/D converter 53 in response to the sampling frequency fs. The data is latched by the upper-stage latch circuit 54a and the lower-stage latch circuit 54b alternately. The data latched by both of the latch circuits 54a, 54b are processed in the interleaving circuits 55a, 55b, the error-correctioncode encoders 56a, 56b and the timebase-compressing circuits 57a, 57b, then appearing at one of the fixed contacts a, a of the switches SW1, SW2, respectively.

On the other hand, the audio signals from the input terminals T5, T6 are processed in the A/D converters 64a, 64b, the interleaving circuit 65, the error-correction code encoder 66 and the timebase-compressing circuit 67, then appearing at the fixed contact b of the switch SW2.

The switches SW1, SW2 change position by the switching signal from the synchronizing circuit 68 in accordance with the ratio between the timebase-compressing ratios of the timebase-compressing circuits 57a, 57b and 67. Only the data of the video signal is supplied from the movable contact c of the upper-stage switch SW1 through the upper-stage channel coding circuit 58a to the recording amplifier 59a. While, data of the video signal and audio signal are supplied from the movable contact c of the lower-stage switch SW2 through the lower-stage channel coding circuit 58b to the recording amplifier 59b.

Figure 7A:
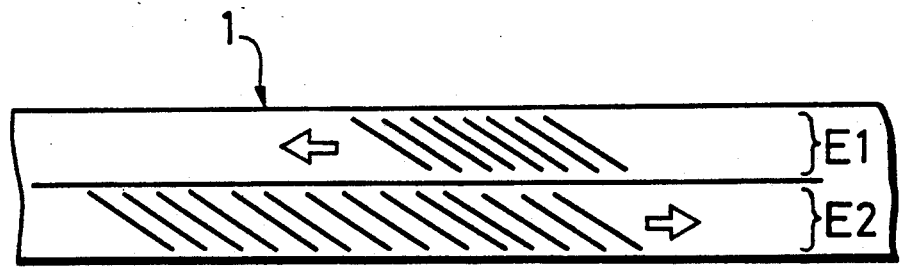
FIG. 7A is an illustration of patterns of tracks formed on a tape in the normal mode.

Since the upper-stage recording amplifier 59a is turned OFF, only the data input in the lower-stage amplifier 59b is amplified therein and recorded in the lower-side track area E2 of the tape 1 by the lower-side rotating heads 2A, 2B as shown in FIG. 7A.

For the backward direction, the switch SW3 is changed to the ON-position and the switch SW4 is changed to the OFF-position contrary to the case of the forward direction. The audio signals are supplied via the input terminals T3, T4 and recorded on the upper-side track area E1 of the tape 1 as shown in FIG. 7A.

Figure 7B:
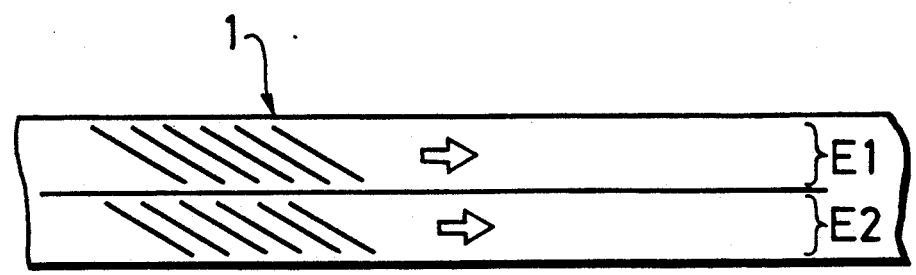
FIG. 7B is an illustration of patterns of tracks formed on a tape in the high picture quality mode.

In the high picture quality recording mode, the two switches SW3, SW4 are both changed to ON-position, and the audio signals on 4 channels are supplied via the input terminals T3 to T6. The video signal supplied via the input terminal T1 is converted into data of 8 bits at sampling frequency fs as in the normal recording mode, then appearing at the upper- and lower-stage switches SW1, SW2. The data of audio signals supplied via the input terminals T3, T4 appear at the upper-stage switch SW1, and the data of audio signals supplied via the input terminals T5, T6 appear at the lower-stage switch SW2. Then, the data of video signal and audio signal are supplied from the switches SW1, SW2 through the channel coding circuits 58a, 58b to the upper-and lower-stage recording amplifiers 59a, 59b. Since both the recording amplifiers 59a, 59b stay ON, the data is recorded on the upper- and lower-stage track areas E1, E2 of the tape 1 by the upper- and lower-stage rotating heads 3A, 3B and 2A, 2B as shown in FIG. 7B.

That is, in the normal mode, since the video signal is converted into the data of 8 bits at sampling frequency fs by the A/D converter 53 and only half the data is recorded, the recorded data is equivalent to the data sampled at ½ fs. In the high picture quality mode, the video signal converted into digital data at sampling frequency fs is all recorded and hence, the transmission rate becomes twice that in the normal mode, so that the quality of picture is improved.

At the time of reproducing, if the tape 1 is recorded in the normal mode, the switch SW7 shown in FIG. 6 is changed to the fixed contact L by the switching signal from the system controller (not shown) in the forward direction. The lower-stage rotating heads 2A, 2B pick up the data (video and audio data) recorded on the lower-stage track area E2 of the tape 1, and the thus picked-up data is, as described above, processed in the equalizer 70b, the data clock reproducing circuit 71b, the channel decoding circuit 72b and the timebase-correcting circuit 73b, then appearing at the movable contact c of the switch SW6. The switch SW6 is changed in position by the switching signal from the synchronizing circuit 74, so that the data of video signal is supplied to one fixed contact a of the switch SW6 and the data of audio signal to the other fixed contact b thereof. The data of video signal data is, as described above, processed in the lower-stage timebase-expanding circuit 75b, the error-correction code coding circuit 76b and the de-interleaving circuit 77b and then fed to the de-multiplexer 78. The de-multiplexer 78 selects lower-side data since the switch SW7 is connected to its fixed contact L. The input data to the de-multiplexer 78 is supplied through the D/A converter 79 to the output terminal T9. The audio signal data is, as described above, processed in the lower-stage timebase-expanding circuit 80b, the error-correction code decoding circuit 81b, the de-interleaving circuit 82b and the D/A converters 84a, 84b and then fed to the output terminals T10, T11.

In the reverse reproducing in the normal mode, the switch SW7 is connected to the fixed contact H by the switching signal from the system controller. Then, the upper-stage rotating heads 3A, 3B pick up the data recorded on the upper-side track area E1 of the tape 1. The thus picked-up data are processed in the equalizer 70a and so on similarly as in the forward side, so that the video signal appears at the output terminal T9 and the audio signals at the upper-stage output terminals T7, T8.

At the time of reproducing, if the tape 1 is recorded in the high picture quality mode, the switch SW7 is connected to the fixed contact M by the switching signal from the system controller. The upper- and lower-stage rotating heads 3A, 3B and 2A, 2B pick up data (video and audio data) recorded on the upper- and lower-track areas E1, E2 of the tape 1. The thus picked-up data is processed or the like as in the normal mode, so that the audio data picked up by the upper-stage rotating heads 3A, 3B is produced at the output terminals T7, T8 and the audio data picked up by the lower-stage rotating heads 2A, 2B are produced at the output terminals T10, T11. Thus 4-channel audio signals is produced. The video data picked up by the upper- and lower-stage rotating heads 3A, 3B and 2A, 2B is processed as in the normal mode and supplied from the upper and lower de-interleaving circuits 77a, 77b to the de-multiplexer 78. The de-multiplexer 78 switches data being selected at the sampling frequency fs and receives all the upper-side data from the upper-stage de-interleaving circuit 77a and the lower-side data from the lower-stage de-interleaving circuit 77b. The received data is all supplied through the D/A converter 79 to the output terminal T9. In other words, in the high picture quality mode, the original video signal is formed of almost twice as much data as the amount of data used in the normal mode and thus provides high-quality pictures images.

The pattern of tracks recorded on the tape in the high picture quality mode, as shown in FIG. 7B, is, when considering only the upper-stage track area E1 or the lower-stage track area E2, the same as that in the normal mode as shown in FIG. 7A and thus the data in the high picture quality mode is compatible with that in the normal mode. Therefore, even if the tape 1 recorded in the high picture quality mode is recorded over its upper or lower track area E1 or E2 with another video signal in the normal mode (i.e., the so-called after-recording is executed), the video signal recorded in the high picture quality mode can be reproduced in the normal mode. Further, even if either of the rotating heads 3A, 3B or 2A, 2B is clogged, the other head can automatically be used to continue recording or reproducing in the normal mode.

While in the high picture quality mode the audio data is recorded as 4-channel stereo data, it may be recorded as 2-channel high quality audio data at an increased sampling rate of the audio signal.

Moreover, while in the above-mentioned embodiment the rate of sampling the video signals is increased for making the picture quality high in the high picture quality mode in which the transmission rate can be increased as compared with that in the normal mode, the number of bits of digital data into which a video signal is to be converted may be increased in and the data of more significant bits thereof is recorded on the upper track area while the data of less significant bits on the lower track area to thereby make the quality of picture high. In addition, data for error-correction and data for interpolation may be added in the high picture quality mode in order to improve the quality of picture.

Furthermore, while in the above-mentioned embodiment the tape 1 is segmented into two track areas E1 and E2 (e.g., n=2), it may be segmented into three or more track areas (e.g., n=3) in order that a video signal in one channel is distributed into the three or more track areas.

According to the second embodiment of the present invention as set forth above, in a recording apparatus for recording data on a plurality of track areas of the tape which is segmented in its width direction, a video signal of high quality is distributed into a plurality of track areas and then recorded thereon, so that much data can be recorded by making the transmission rate of data to be recorded high to improve the quality of picture.

Further, in order that the above-mentioned high picture quality recording mode is generalized, it becomes possible to provide a magnetic recording apparatus in which n magnetic heads (n is an integer of 2 or more) are provided on a rotating drum with a step of about 1/n the width of the magnetic tape and are supplied with wide-band signals of n channels at a time. Thus, the wide-band signals of a plurality of channels can be recorded at a time.

Moreover, when the magnetic tape is segmented in the width direction into a plurality of stage areas and skewed tracks are successively formed along each stage area, it is possible to make a wrapping angle $\phi$ of a magnetic tape around a rotating drum and a lead angle $\theta$ of the magnetic tape equal to that in the conventional single-stage area helical scan type and thereby reduce the diameter Dd of the rotating drum.

That is, as shown in FIG. 4, if the effective width of the magnetic tape 1, the guardband width between the stage areas, and the number of segmented stage areas are represented by Wef, Wg and n, respectively, the lead angle (still angle) $\theta$ can be expressed by the following equation (1):

$$\theta = \sin^{-1} \frac{Wef - (n-1)Wg}{\pi Ddn\phi} \times 360 \quad (1)$$

From Eq. (1) it will be easily understood that the larger the segmented stage-area number n, the more that the rotating drum diameter can be reduced and that the wrapping angle $\theta$ and the lead angle $\theta$ can be decreased to keep the traveling property of the magnetic tape in good condition, and resulting in a small-sized apparatus.

It should be understood that the above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. An apparatus for recording both video and audio information signals on a magnetic tape comprising:
    (a) processing means for separately receiving and processing the video and audio information signals to be magnetically recorded;
    (b) a drum rotatable about an axis of revolution and having n (n is an integer>2) recording/reproducing heads circumferentially spaced apart on the rotatable drum and displaced from each other at a step of about 1/n the width of the magnetic tape in the direction of the axis of revolution of the drum;
    (c) distributing means for selectively supplying the processed video and audio information signals together to a selected one of n recording/reproducing heads, wherein the supplied processed video and audio information signals are recorded together in each one of a plurality of parallel tracks on the magnetic tape in one or more stage areas which are 1/n the width of the magnetic tape; and
    (d) means for selectively transporting the magnetic tape relative to the recording/reproducing heads in a forward direction or a reverse direction and wherein the distributing means is responsive to the direction that the magnetic tape travels and supplies the processed video and audio information signals to one of the n recording/reproducing heads in accordance with the direction of magnetic tape travel.

2. The apparatus according to claim 1, wherein the processing means includes means for time base compressing the video information signal by a first, predetermined ratio and time base compressing the audio information signal by a second, predetermined ratio and further wherein the distributing means includes means for recording the time based compressed video information signal and the time based compressed audio information signal together in each track in accordance with the ratio of the first and second ratios.

3. An apparatus for recording both video and audio information signals on a magnetic tape comprising:
    (a) processing means for separately receiving and processing the video and audio information signals to be magnetically recorded;
    (b) a drum rotatable about an axis of revolution and having at least two recording/reproducing heads circumferentially spaced apart on the rotatable drum and displaced from each other at a step of about ½ the width of the magnetic tape in the direction of the axis of revolution such that there is at least one upper recording/reproducing head and at least one lower recording/reproducing head;

(c) distributing means for selectively supplying the processed video and audio information signals together to either the upper recording/reproducing head or the lower recording/reproducing head, wherein the supplied processed video and audio information signals are recorded together in a plurality of track areas on the magnetic tape; and (d) means for selectively transporting the magnetic tape relative to the recording/reproducing heads in a forward direction or a reverse direction and wherein the distributing means is responsive to the direction that the magnetic tape travels and supplies the processed video and audio information signals to either the upper recording/reproducing heads or the lower recording/reproducing heads in accordance with the direction of magnetic tape travel.

4. The apparatus according to claims 1 or 3, wherein the processing means converts the video and audio information signals to digital form.

5. An apparatus for recording both video and audio information signals on a magnetic tape comprising:
(a) processing means for separately receiving and processing the video and audio information signals to be magnetically recorded;
(b) a drum rotatable about an axis of revolution and having n (n is an integer >2) recording/reproducing heads circumferentially spaced apart on the rotatable drum and displaced from each other at a step of about 1/n the width of the magnetic tape in the direction of the axis of revolution of the drum;
(c) distributing means for selectively supplying the processed video and audio information signals together to a selected one of n recording/reproducing heads, wherein the supplied processed video and audio information signals are recorded together in each one of a plurality of parallel tracks on the magnetic tape in one or more stage areas which are 1/n the width of the magnetic tape; and
(d) wherein the processing means further comprises sampling means for dividing the video information signal and alternately sampling each of the divided video information signals at a selected sampling frequency and wherein the distributing means supplies one of the divided and sampled video information signals to only one of the magnetic heads when the video information signal is a standard video signal and supplies a different one of divided and sampled video information signals to each of the magnetic heads when the information signal is a wide-band video signal.

6. An apparatus for recording both video and audio information signals on a magnetic tape comprising:
(a) processing means for separately receiving and processing the video and audio information signals to be magnetically recorded;
(b) a drum rotatable about an axis of revolution and having n (n is an integer >2) recording/reproducing heads circumferentially spaced apart on the rotatable drum and displaced from each other at a step of about 1/n the width of the magnetic tape in the direction of the axis of revolution of the drum;
(c) distributing means for selectively supplying the processed video and audio information signals together to a selected one of n recording/reproducing heads, wherein the supplied processed video and audio information signals are recorded together in each one of a plurality of parallel tracks on the magnetic tape in one or more stage areas which are 1/n the width of the magnetic tape; and
(d) wherein the tracks are recorded in n staging areas across the width of the track and parallel to each other at an angle $\theta$, where:

$$\theta = \sin^{-1}\left(\frac{W_{ef} - (n-1)W_g}{\pi D d n \phi}\right) \times 360$$

and
$\phi$ = the wrapping angle of the magnetic tape on the drum;
$W_g$ = a guard band width between stage areas; and
$W_{ef}$ = the effective width of the tape.

7. A method for recording both video and audio information signals on a magnetic tape comprising the steps of:
(a) separately receiving and processing the video and audio information signals to be magnetically recorded;
(b) selectively recording the processed video and audio information signals together in a plurality of track areas along the upper or the lower half width of the magnetic tape; and
(c) selectively transporting the magnetic tape relative to the recording/reproducing heads in a forward direction or a reverse direction and wherein the recording step comprises recording the video and audio information signals together in the lower half width of the magnetic tape when it is traveling in the forward direction and in the upper half width of the magnetic tape when it is traveling in the reverse direction.

8. The method according to claim 7, wherein the processing step includes steps of time base compressing the video information signal by a first, predetermined ratio and the audio information signal by a second, predetermined ratio and further wherein the recording step includes recording the time based compressed video information signal and the time based compressed audio information signal together in each track in accordance with the ratio of the first and second ratios.

9. A method for recording both video and audio information signals on a magnetic tape comprising the steps of:
(a) separately receiving and processing the video and audio information signals to be magnetically recorded;
(b) selectively recording the processed video and audio information signals together in a plurality of track areas along the upper or the lower half width of the magnetic tape; and
(c) dividing the video information signal and alternately sampling each of the divided video information signals at a selected sampling frequency and recording only one of the divided and sampled video information signals when the video information signal is a standard video signal and recording each of the divided and sampled video information signals in a different half width of the magnetic tape when the information signal is a wide-band video signal.

10. An apparatus for recording both video and audio information signals on a magnetic tape comprising:
  (a) processing means for separately receiving and processing the video and audio information signals to be magnetically recorded;
  (b) a drum rotatable about an axis of revolution and having at least two recording/reproducing heads circumferentially spaced apart on the rotatable drum and displaced from each other at a step of about ½ the width of the magnetic tape in the direction of the axis of revolution such that there is at least one upper recording/reproducing head and at least one lower recording/reproducing head;
  (c) distributing means for selectively supplying the processed video and audio information signals together to either the upper recording/reproducing head or the lower recording/reproducing head, wherein the supplied processed video and audio information signals are recorded together in a plurality of track areas on the magnetic tape; and
  (d) wherein the processing means further comprises sampling means for dividing the video information signal and alternately sampling each of the divided video information signals at a selected sampling frequency and wherein the distributing means supplies one of the divided and sampled video information signals to only one of the magnetic heads when the video information signal is a standard video signal and supplies a different one of divided and sampled video information signals to each of the magnetic heads when the information signal is a wide-band video signal.

* * * * *